US006782254B1

United States Patent
Chambers et al.

(10) Patent No.: US 6,782,254 B1
(45) Date of Patent: Aug. 24, 2004

(54) HANDLING OF FORWARD-TO NUMBERS ACROSS REGIONAL AND POLITICAL BOUNDARIES

(75) Inventors: Michael Dwayne Chambers, Plainfield, IL (US); Weiqian Dai, Naperville, IL (US); Chee Keong Lee, Hilliard, OH (US); Tony Tuong Nguyen, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/364,724

(22) Filed: Jul. 30, 1999

(51) Int. Cl.[7] ................................................ H04Q 7/00
(52) U.S. Cl. ...................... 455/417; 455/433; 455/445
(58) Field of Search ................................. 455/417, 433, 455/445, 403, 424, 428, 432, 435, 422, 414, 461; 379/219, 220, 229

(56) References Cited

U.S. PATENT DOCUMENTS

| | | | | |
|---|---|---|---|---|
| 5,557,654 A | * | 9/1996 | Maenpaa ..................... 379/58 |
| 5,867,788 A | * | 2/1999 | Joensuu ....................... 455/445 |
| 5,878,347 A | * | 3/1999 | Joensuu et al. ............. 455/433 |
| 5,950,126 A | * | 9/1999 | Palviainen et al. ......... 455/423 |
| 5,978,678 A | * | 11/1999 | Houde et al. ............... 455/433 |
| 6,006,094 A | * | 12/1999 | Lee .............................. 455/445 |
| 6,081,705 A | * | 6/2000 | Houde et al. ................ 455/411 |
| 6,085,081 A | * | 7/2000 | Leskinen ..................... 455/406 |
| 6,134,433 A | * | 10/2000 | Joong et al. ................. 455/417 |

* cited by examiner

*Primary Examiner*—Cong Van Tran

(57) ABSTRACT

A method of forwarding a call properly for a wireless terminal when the wireless terminal is roaming in a different region (or country) than where its home location register resides is disclosed. In particular, this is accomplished by having the home location register and the serving wireless switching system implement procedures for internationalizing, when appropriate, forward-to numbers, and for nationalizing, when appropriate the same forward-to numbers. The illustrative embodiment of the present invention comprises: receiving at a first wireless switching center a first call set-up message from a second wireless switching center; transmitting, in response to the first call set-up message, a second call set-up message from the first wireless switching center to a third wireless switching center; receiving, in response to the second call set-up message, a first call set-up response message at the first wireless switching center from the third wireless switching center; and transmitting, in response to the first call set-up response message, a call set-up response message from the first wireless switching center to the second wireless switching center directing the second wireless switching center to set-up a call directly with the third wireless switching center.

19 Claims, 3 Drawing Sheets

100

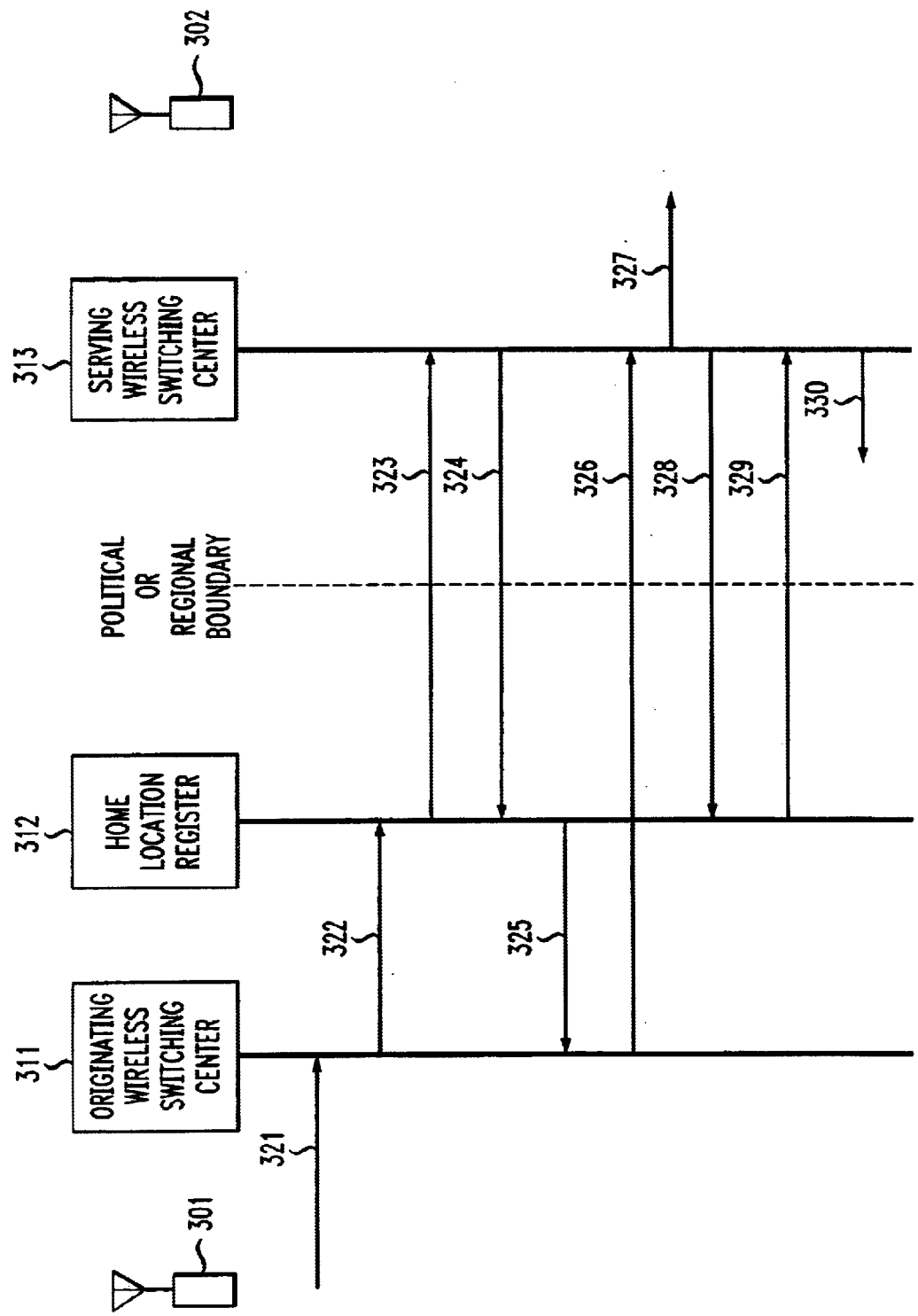

HANDLING OF FORWARD-TO NUMBERS ACROSS REGIONAL AND POLITICAL BOUNDARIES

FIELD OF THE INVENTION

The present invention relates to telecommunications in general, and, more particularly, to a technique for forwarding a wireless telecommunications call across a regional or political boundary.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic area. The heart of a typical wireless telecommunications system is Wireless Switching Center ("WSC") 120, which is sometimes also known as a Mobile Switching Center ("MSC") or a Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to the local and long-distance telephone and data networks (e.g., local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120 over wireline 102-1. Upon receipt of the information, and with the knowledge that it is intended for wireless terminal 101-2, Wireless Switching Center 120 then returns the information back to base station 103-1 over wireline 102-1, which relays the information, via radio, to wireless terminal 101-2.

Because a wireless terminal is mobile, it can be served by different base stations as it moves. In fact, if a wireless terminal moves a substantial distance it can be serviced by another wireless switching center and its satellite base stations rather than by the wireless terminal's "home" wireless switching center. Furthermore, if the serving wireless switching center is in a different region or country than the wireless terminal's home wireless switching center, this can cause the serving wireless switching center to fail to provide the correct service to the wireless terminal.

For example, FIG. 2 depicts a flowchart of a method in the prior art, which involves the interaction of two wireless switching centers (originating WSC 211 and serving WSC 213), home location register 212, and two wireless terminals (wireless terminal 201 and wireless terminal 202) as the wireless switching centers and home location register 212 attempt to establish a call from wireless terminal 201 to wireless terminal 202.

Originating WSC 211 and serving WSC 213 are each conventional wireless switching centers. Typically, home location register 212 and serving WSC 213 are in different regions (or countries) and serving WSC 213 and wireless terminal 202 are in the same region (or country). For example, home location register 212 might be in northern Illinois and serving WSC 213 and wireless terminal 202 might be in Seoul, Korea. It is irrelevant whether originating WSC 211 is in the same region (or country) as either home location register 212 or serving WSC 213. Home location register 212, might be, but is not necessarily, associated with originating WSC 211.

For the purposes of this specification, the word "region" is defined as one or more geographic areas that are: (1) owned or operated by the same entity, or (2) administered by the same regulatory body. For the purposes of this specification, the word "country" is defined as a primary political unit (e.g., the United States, Canada, the United Kingdom, Japan, etc.) or a subprimary political unit (e.g., New Jersey, Alberta, Wales, Okinawa, etc.).

Wireless terminal 201 is typically a conventional wireless terminal that is currently served by originating WSC 211. It is irrelevant whether wireless terminal 201 is being served by its home wireless switching center or is roaming and being served by another wireless switching center.

Wireless terminal 202 is typically a conventional wireless terminal whose home location register is home location register 212. Home location register 212 comprises a database that includes:

i. the identity of the wireless switching center that is serving wireless terminal 202 at any given time (in this case serving wireless switching center 213); and ii. at least one forward-to number for wireless terminal 202, which forward-to number might or might not include a "country-code" or international dialing prefix.

For the purpose of this specification, a "forward-to number" for a wireless terminal is defined as the number to which an incoming call to the wireless terminal is forwarded if, for some reason, the incoming call cannot be completed to the wireless terminal. Typically, the forward-to number is associated with an answering machine.

As shown in FIG. 2, wireless terminal 202 is roaming and is currently being served by serving WSC 213. When wireless terminal 202 first enters the area served by serving WSC 213, wireless terminal 202 registers with serving WSC 213, and serving WSC 213 sends a message to home location register 212 indicating that wireless terminal 202 is currently being served by serving WSC 213. By sending a message to home location register 212 indicating that wireless terminal 202 is currently being served by serving WSC 213, serving WSC 213 enables home location register 212 to know where wireless terminal 202 is at any moment.

In steps 221 through 227 originating WSC 211, home location register 212 and serving WSC 213 attempt to set-up a call to wireless terminal 202. But if wireless terminal 202 is unavailable to receive the call, for any reason, serving WSC 213 seeks, in steps 228 and 229, a "forward-to" number from home location register 212 where the call can be forwarded. Such a number might represent an automatic answering system. But where home location register 212 and serving WSC 213 are in different regions (or countries), the forward-to number provided to serving WSC 213 might or might not have the proper international country code prefix and might be erroneously forwarded by serving WSC 213 as an national call, or might be erroneously forwarded as an international call. Furthermore, if the forward-to number is provided as a national number without an international country code prefix, but is to be associated with a another nation, then serving WSC 213 cannot complete the call properly.

Therefore, the need exists for a technique for properly forwarding calls for wireless terminals that are roaming across regional and political boundaries.

SUMMARY OF THE INVENTION

Some embodiments of the present invention are capable of forwarding a call properly for a wireless terminal when the wireless terminal is roaming in a different region (or country) than where its home location register resides. In particular, this is accomplished by having the home location register and the serving wireless switching system implement procedures for internationalizing, when appropriate, forward-to numbers, and for nationalizing, when appropriate the same forward-to numbers.

The illustrative embodiment of the present invention comprises: receiving at a home location register a transfer number request message from a serving wireless switching center, wherein the transfer number request message is associated with a wireless terminal; adding a country code associated with the home location register to a forward-to number associated with the wireless terminal when the forward-to number lacks a country code; and transmitting from the home location register the forward-to number to the serving wireless switching center.

BRIEF DESCRIPTION OF THE DRAWINGS

FIG. 3 depicts a flowchart of the interaction of two wireless switching centers, one home location register and two wireless terminals that are involved in forwarding a call in accordance with the illustrative embodiment of the present invention.

DETAILED DESCRIPTION

Figure 1:
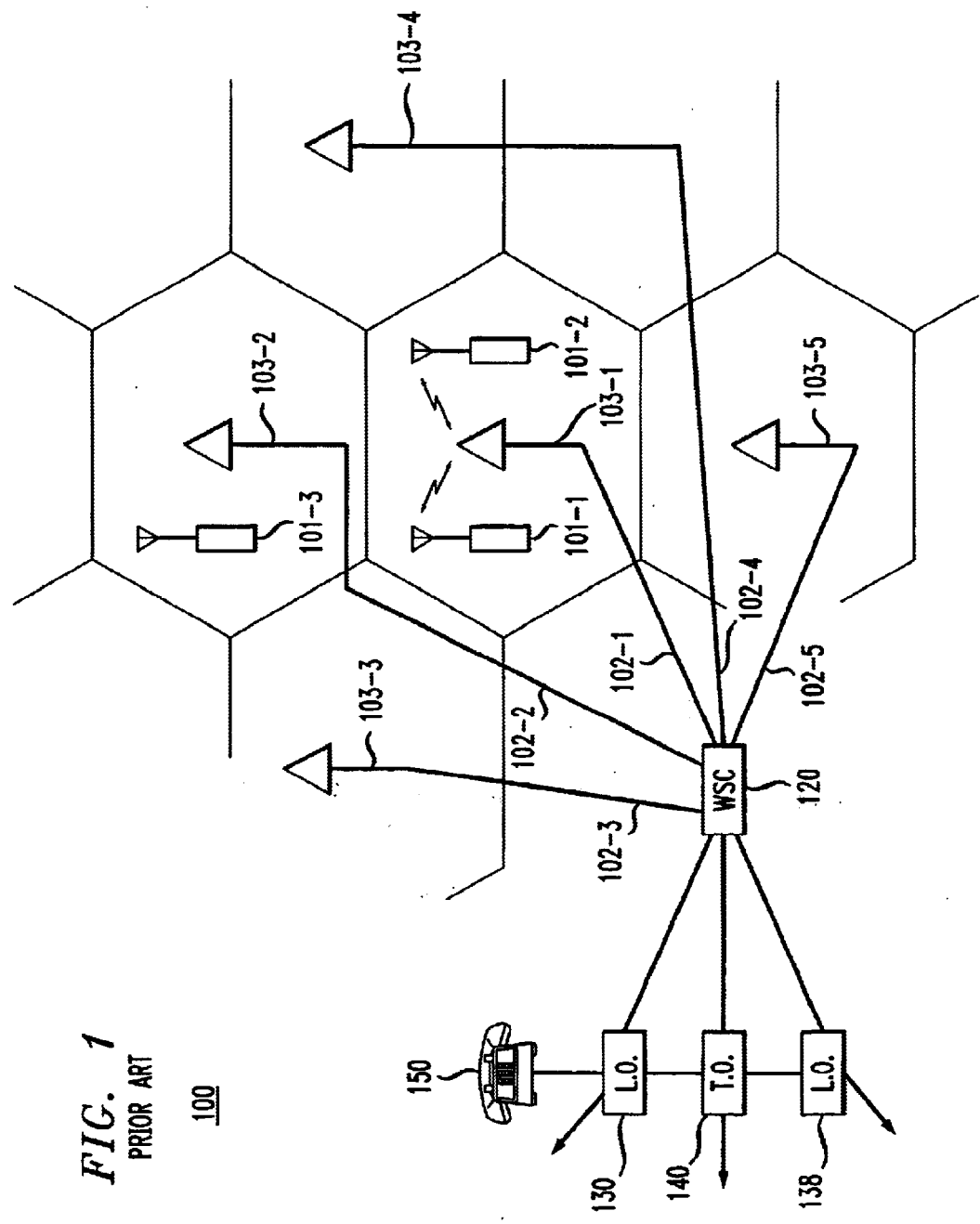
FIG. 1 depicts a schematic diagram of a wireless telecommunications system in the prior art.
Figure 2:
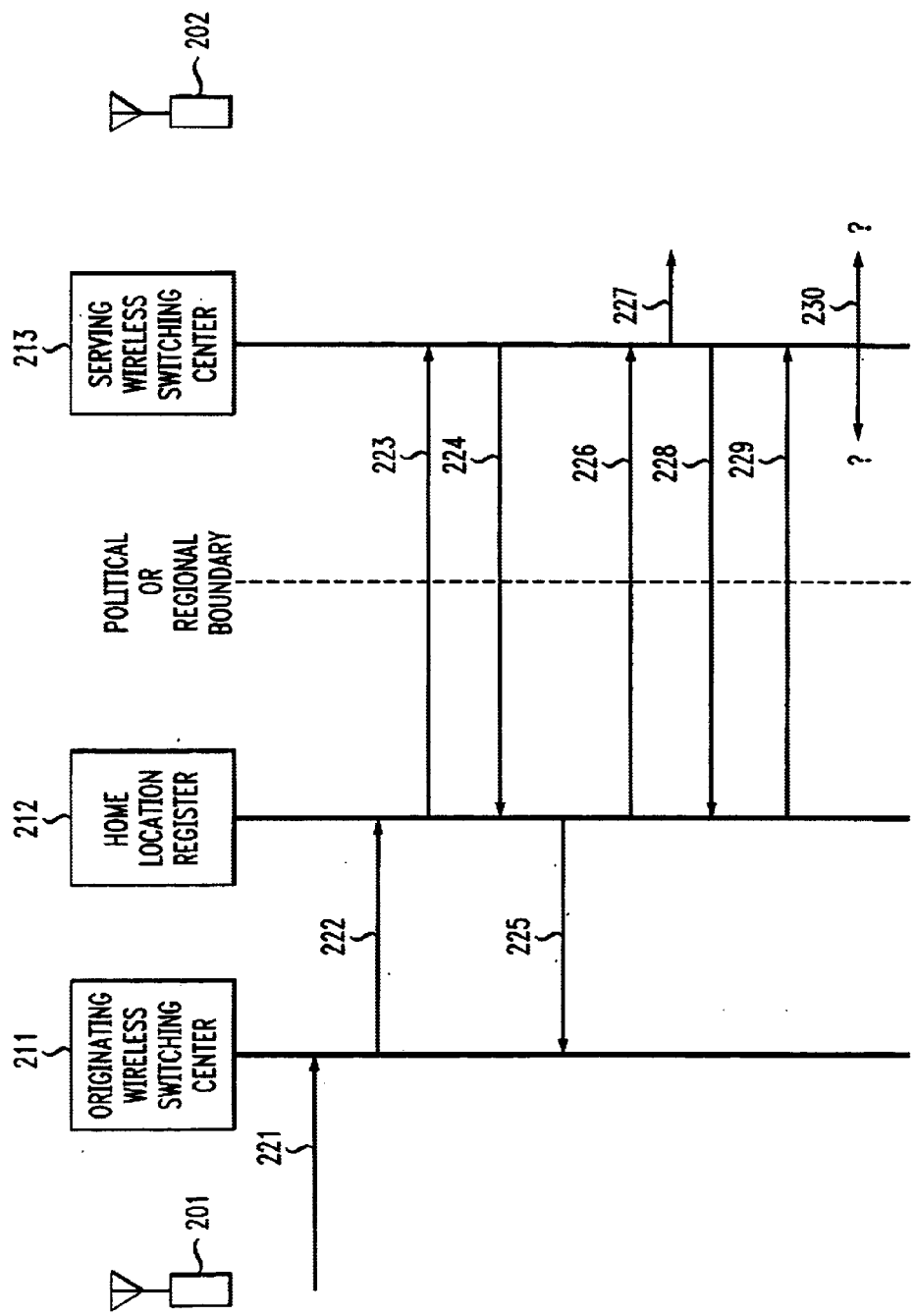
FIG. 2 depicts a flowchart of the interaction of two wireless switching centers, one home location register and two wireless terminals in the prior art that attempt to forward a call across a regional or political boundary.

FIG. 3 depicts a flowchart of the illustrative embodiment of the present invention, which involves the interaction of two wireless switching centers (originating WSC 311 and serving WSC 313), home location register 312, and two wireless terminals (wireless terminal 301 and wireless terminal 302) as the wireless switching centers and home location register 312 attempt to establish a call from wireless terminal 301 to wireless terminal 302.

Originating WSC 311 and serving WSC 313 are each conventional wireless switching centers as well-known in the art, except that each is uniquely associated with a network address (e.g., an E.212 address, an IP address, etc.) and each is capable of performing the functionality described below. Advantageously, both home location register 312 and serving WSC 313 are capable of analyzing the network address of another network entity (e.g., a wireless switching center, a home location register, a visiting location register, etc.), to determine if both it and the other network entity are in the same or different regions (or countries).

In the illustrative embodiment, home location register 312 and serving WSC 313 are in different regions (or countries). For example, home location register 312 might be in northern Illinois and serving WSC 313 might be in Seoul, Korea. It is irrelevant to the present invention whether originating WSC 311 is in the same region (or country) as either home location register 312 or serving WSC 313. Home location register 312, might be, but is not necessarily, associated with originating WSC 311. Advantageously, originating WSC 311, home location register 312, and serving WSC 313 are all interconnected, in well-known fashion, via traffic networks (e.g., the Public Switched Telephone Network, etc.) and signaling networks (e.g., the SS7 network, etc.).

Wireless terminal 301 is advantageously a conventional wireless terminal, as is well known to those skilled in the art, that is currently served by originating WSC 311. It is irrelevant to an understanding of the present invention whether wireless terminal 301 is being served by its home wireless switching center or is roaming and being served by another wireless switching center.

Wireless terminal 302 is advantageously a conventional wireless terminal, as is well known to those skilled in the art, whose home location register is home location register 312. Home location register 312 comprises a database that includes:

i. the network address (e.g., an E.212 address, an IP address, etc.) for itself.

ii. the identity of the wireless switching center that is serving wireless terminal 302 at any given time (in this case serving wireless switching center 313).

iii. at least one "forward-to" number for wireless terminal 302, which forward-to number might or might not include a "country-code" or international dialing prefix.

In accordance with the illustrative embodiment, wireless terminal 302 is roaming and is currently being served by serving WSC 313. When wireless terminal 302 first enters the area served by serving WSC 313, wireless terminal 302 registers with serving WSC 313, in well-known fashion, and serving WSC 313 sends a message to home location register 312 indicating that wireless terminal 302 is currently being served by serving WSC 313. By sending a message to home location register 312 indicating that wireless terminal 302 is currently being served by serving WSC 313, serving WSC 313 enables home location register 312 to know where wireless terminal 302 is at any moment.

Referring again to FIG. 3, the illustrative embodiment begins at step 321. At step 321, wireless terminal 301 initiates a call to wireless terminal 302 by placing the call via originating WSC 311, in well-known fashion. As part of step 321, wireless terminal 301 provides an indicium (e.g., the telephone or directory number, etc.) of the identity of wireless terminal 302 to originating WSC 311 so that originating WSC 311 can determine how and where to direct the call. Originating WSC 311 analyzes the indicium, in well-known fashion, to determine that the home location register of wireless terminal 301 is home location register 312.

Therefore, at step 322, originating WSC 311 transmits a location request message to home location register 312 to learn from home location register 312 the identity of the wireless switching system currently serving wireless terminal 302. Advantageously, the location request message comprises the indicium of wireless terminal 302.

As part of step 322, home location register 312 receives the location request message from originating WSC 311 and determines, in well-known fashion, that wireless terminal 302 is currently being served by serving WSC 313.

Therefore, at step 323 and in response to the receipt of the location request message, home location register 312 transmits a route request message to serving WSC 313 to get a temporary local directory number where wireless terminal 302 can be reached. Advantageously, the route request message comprises: (1) the mobile station identifier (e.g., international mobile station identity or IMSI, etc.) for wireless terminal 302, and (2) the network address of home location register 312.

At step 324, in response to the receipt of the location request message, serving WSC 313 allocates a temporary local directory number to wireless terminal 302 and transmits a route request response message back to home location register 312 that comprises the temporary local directory number of wireless terminal 302.

At step 325, in response to the transmission of the location request message in step 322, home location register 312 transmits a location request response message back to originating WSC 311 that advantageously comprises: (1) the temporary local directory number of wireless terminal 302, and (2) the mobile station identifier (e.g., the international mobile station identity or IMSI, etc.) of wireless terminal 302. Therefore, with the completion of step 325, originating WSC 311 has possession of information it needs to attempt to set up the call from wireless terminal 301 to wireless terminal 302.

At step 326, originating WSC 311 attempts to establish a voice trunk connection to serving WSC 313 using existing protocols (e.g., SS7 protocols, etc.), in well-known fashion, and using the temporary local directory number of wireless terminal 302 received in step 325.

At step 327, serving WSC 313 attempts to establish a connection with wireless terminal 302, in well-known fashion. In accordance with the illustrative embodiment, serving WSC 313 is unable to establish a connection with wireless terminal 302. The reasons include, but are not limited to:

i. wireless terminal 302 does not respond to the page by serving WSC 313 (perhaps because wireless terminal 302 is not powered on or is inaccessible)

ii. the user of wireless terminal 302 does not respond after alerting (perhaps because the user cannot sense the alerting or does not want to respond)

iii. wireless terminal 302 is currently engaged in another call (i.e., because the wireless terminal is busy)

Therefore, because serving WSC 313 could not establish a connection with wireless terminal 302, serving WSC 313 attempts to get a forward-to number to forward the call to.

Therefore, at step 328 serving WSC 313 transmits a transfer number request message to home location register 312. Advantageously, the transfer number request message comprises: (1) the international mobile station identity associated with wireless terminal 302, (2) a redirection reason (e.g., no answer, no page response, busy, etc.), and (3) the network address of serving WSC 313.

As part of step 328, home location register 312 receives the transfer number request message from serving WSC 313, which advantageously comprises: (1) the international mobile station identity associated with wireless terminal 302, (2) a redirection reason (e.g., no answer, no page response, busy, etc.), and (3) the network address of serving WSC 313. When home location register 312 receives the transfer number request message, it retrieves from its own database, in well-known fashion, a forward-to number associated with wireless terminal 302 that might also be dependent on the redirection reason. The forward-to number might or might not include a country code. Home location register 312 then adds a county code (advantageously the country code associated with home location register 312) to the forward-to number when, and only when, the forward-to number lacks a country code and when the network address of serving WSC 313 indicates that it is in a different region (or country) than is home location register 312. If the retrieved forward-to number already comprises a country code, then home location register 312 leaves the number alone.

Then at step 329, home location register 312 transmits the forward-to number to serving WSC 313. As part of step 329, serving WSC 313 receives the forward-to number from home location register 312 and strips the country code from the forward-to number when, and only when, the country code in the forward-to number is the same as the county code of serving WSC 313. Otherwise, then serving WSC 313 leaves the number alone.

Therefore, at step 330, serving WSC 313 forwards the call to the forward-to number as a national call when country code in the forward-to number is the same region (or country) as is serving WSC 313. Otherwise, serving WSC 313 forwards the call as an international call. In this manner, serving WSC 313 is able to properly forward a call to a forward-to number for a wireless terminal that is roaming across a regional or political boundary and for a wireless terminal that is not roaming across a regional or political boundary.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:

receiving at a home location register a transfer number request message from a serving wireless switching center, wherein said transfer number request message is associated with a wireless terminal;

adding at said home location register a country code associated with said home location register to a forward-to number associated with said wireless terminal when said forward-to number lacks said country code; and transmitting from said home location register said forward-to number to said serving wireless switching center.

2. The method of claim 1 wherein said home location register is in one region and said serving wireless switching center is in a second region.

3. The method of claim 1 wherein said home location register is in one country and said serving wireless switching center is in a second country.

4. The method of claim 1 wherein said transfer number request message comprises an E.212 address of said serving wireless switching center.

5. The method of claim 1 wherein said transfer number request message comprises a mobile station identifier of said wireless terminal.

6. The method of claim 1 wherein said transfer number request message comprises a redirect reason.

7. The method of claim 1 wherein said step of adding is performed at said home location register.

8. A method comprising:
   receiving at a home location register a transfer number request message from a serving wireless switching center, wherein said transfer number request message is associated with a wireless terminal and wherein said transfer number request message comprises a network address of said serving wireless switching center;
   adding at said home location register a country code associated with said home location register to a forward-to number associated with said wireless terminal when said forward-to number lacks a country code and when said network address indicates that serving wireless switching center is in a different country than said home location register; and
   transmitting from said home location register said forward-to number to said serving wireless switching center.

9. The method of claim 8 wherein said network address is an E.212 address.

10. The method of claim 8 wherein said transfer number request message comprises a mobile station identifier of said wireless terminal.

11. The method of claim 8 wherein said transfer number request message comprises a redirect reason.

12. The method of claim 8 wherein said step of adding is performed at said home location register.

13. A method comprising:
   receiving at a home location register a transfer number request message from a serving wireless switching center, wherein said transfer number request message is associated with a wireless terminal;
   adding at said home location register a country code associated with said home location register to a forward-to number associated with said wireless terminal when said serving wireless switching center is in a different country than said home location register; and
   transmitting from said home location register said forward-to number to said serving wireless switching center.

14. The method of claim 13 wherein said transfer number request message comprises a mobile station identifier of said wireless terminal.

15. The method of claim 13 wherein said transfer number request message comprises a redirect reason.

16. A method comprising:
   transmitting from a serving wireless switching center to a home location register a transfer number request message;
   receiving at said serving wireless switching center a forward-to number in response to the transmission of said transfer number request message, wherein said forward-to number comprises a first country code; and
   stripping said forward-to number of said first country code when said first country code is as a first country code associated with said serving wireless switching system.

17. The method of claim 16 further comprising placing a call with said forward-to number as a national call.

18. The method of claim 16 further comprising placing a call with said forward-to number as an international call.

19. The method of claim 16 further wherein said transfer number request message comprises a mobile station identifier and a redirection reason.

* * * * *